W. A. B. RICHARDSON.
FISH GRAPPLE.
APPLICATION FILED APR. 27, 1914.

1,110,234.

Patented Sept. 8, 1914.
2 SHEETS—SHEET 1.

Inventor
W. A. B. Richardson.

Witnesses

By
Attorney

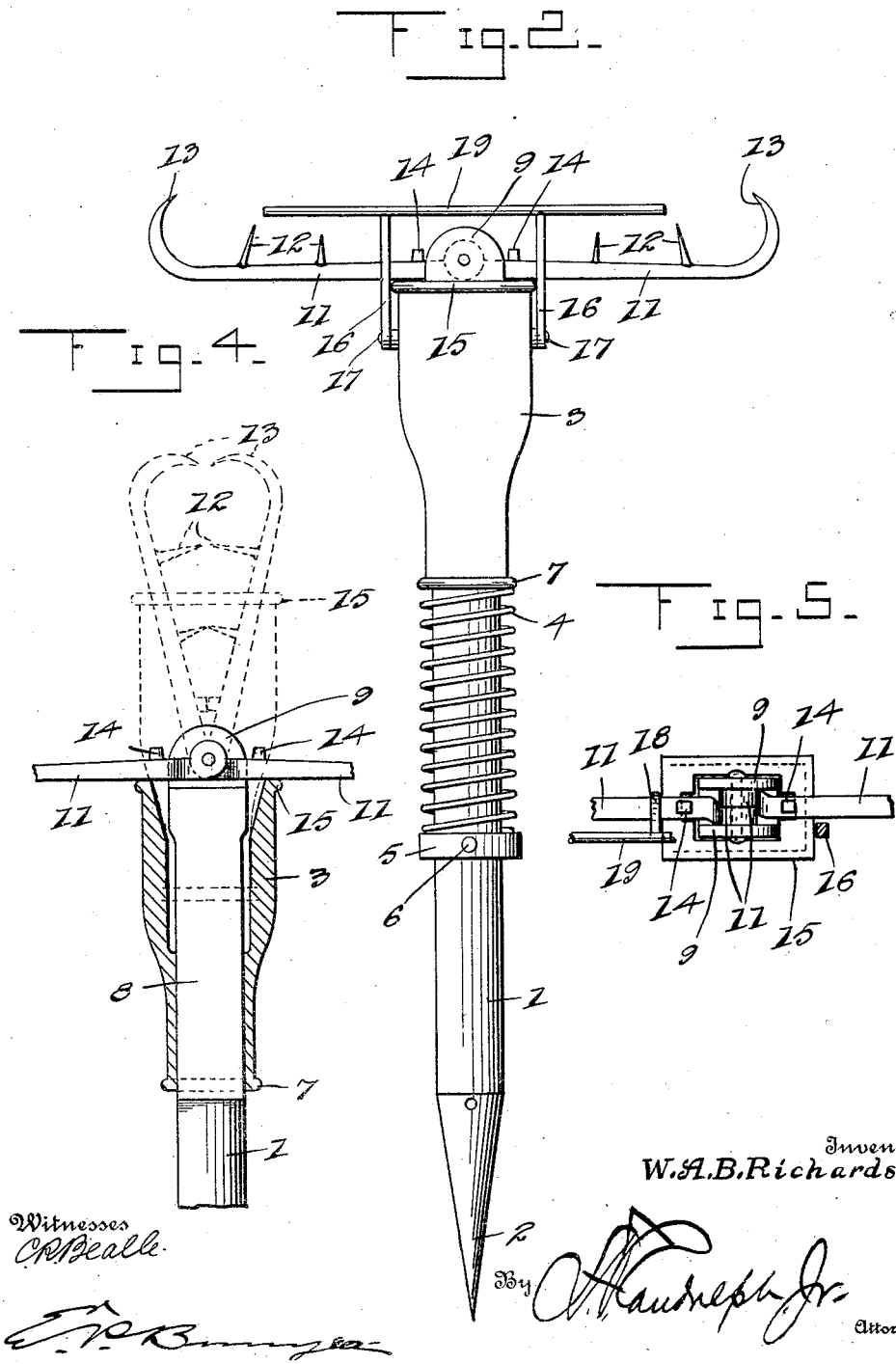

UNITED STATES PATENT OFFICE.

WELLINGTON A. B. RICHARDSON, OF FORKS OF THE SALMON, CALIFORNIA.

FISH-GRAPPLE.

1,110,234. Specification of Letters Patent. Patented Sept. 8, 1914.

Application filed April 27, 1914. Serial No. 834,808.

*To all whom it may concern:*

Be it known that I, WELLINGTON A. B. RICHARDSON, citizen of the United States, residing at Forks of the Salmon, in the county of Siskiyou and State of California, have invented certain new and useful Improvements in Fish-Grapples; and I do hereby declare the following to be a full, clear, and exact description of the invention, such as will enable others skilled in the art to which it appertains to make and use the same.

This invention relates to fish grapples, and one of the principal objects of the invention is to provide a spring actuated grapple which will be reliable and efficient in use and which will be of simple construction and not expensive to manufacture.

Another object of the invention is to provide a fishing device comprising a pair of grapple members which are closed by a spring and which are held open by a trigger which will be released by contact with the fish for permitting the jaws to close and hold the fish and to permit it to be withdrawn from the water.

Still another object of the invention is to provide a grappling for catching fish comprising a pole or rod and a pair of grappling members connected to the pole, said grappling members being held extended by means of a trigger device connected to a rod adapted to contact with the fish to disconnect the trigger and to permit the jaws of the grapple to close upon the fish.

Figure 1:
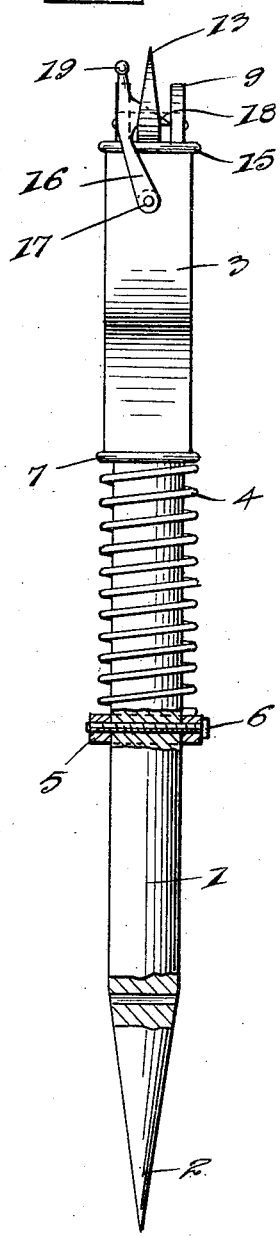
Figure 3:
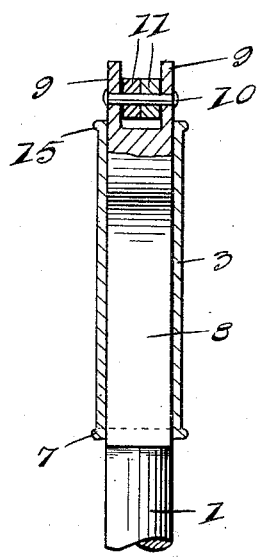
Figure 6:
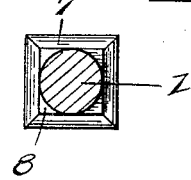

These and other objects may be attained by means of the construction illustrated in the accompanying drawings, in which, Figure 1 is a side elevation and partial section of a fish grappling device made in accordance with this invention and showing the jaws held open by the trigger, Fig. 2 is a front elevation of the same, Fig. 3 is a detail sectional view taken centrally through the grapple head at the pivotal points of the grapple members, Fig. 4 is a view in elevation and partial section showing the grapple arms opened in full line and closed in dotted lines, Fig. 5 is a detail top plan view of the grapple arms, the latter being broken away at their outer ends and portions of the trigger being shown in sections, and Fig. 6 is a transverse sectional view of the shank of the grappling head.

Referring to the drawings, the numeral 1 designates the shank of the grappling head, said shank being pointed as shown at 2 to be connected to a pole or shaft of sufficient length for the purpose. The grapple head 3 is substantially rectangular in cross section and is mounted upon the shank 1. A spiral spring 4 encircles the shank 1, said spring being supported at one end upon a collar 5 connected to the shank 1 by a bolt 6, while the opposite end of said spring 4 bears against a bead 7 formed on the lower end of the grapple head 3. Mounted to slide in the grapple head 3 is a squared portion 8 of the shank 1, and said squared portion is provided with bearing portions 9 at its upper end. Pivoted upon a pin 10 and disposed between the members 9 are the grapple jaws 11, said jaws each being provided with barbs or points 12 and at their outer ends with inwardly extending pointed hooks 13. Stop lugs 14 are formed on the members 11 to prevent the points 12 and hooks 13 coming into contact when the jaws of the grapple members are sprung together. The upper end of the member 3 is provided with a bead 15. For holding the grapple members extended as shown in Fig. 2 against the stress of the spring 4, a trigger device is utilized, said trigger device comprising two arms 16 pivoted at 17 upon opposite sides of the hollow grapple head 3, said arms being each provided with a trigger 18 adapted to engage the members 11 and to hold the jaws open. The arms 16 are connected by a contact rod 19, as shown more clearly in Fig. 2.

The operation of the fish grapple may be briefly described as follows: When the jaws of the grapple are opened as shown in Fig. 2 by pushing downward upon the sliding head 3 against the spring 4, the arms 16 are thrown inward until the triggers 18 engage the grapple members 11, thus holding the jaws opened. When the device is used in a manner similar to a fish spear, the contact rod 19 when it touches the fish will throw the triggers away from the members 11 and the spring 4 will force the hollow head 3 up to close the jaws on the fish.

From the foregoing it will be obvious that a fish grapple made in accordance with this invention will be reliable and efficient in use, inexpensive to manufacture and not liable to get out of order.

Various changes may be made in the details of construction without departing from the spirit and scope of the invention as defined in the claims.

What is claimed is:—

1. A fish grapple comprising a shank, a sliding head mounted on the shank, a spring encircling the shank and bearing against the head, grapple jaws pivotally connected to the shank at its end, pivoted triggers for holding the jaws of the grapple open and a contact rod connected to the triggers.

2. A fish grapple comprising a shank, a collar connected to the shank, a spring surrounding the shank and bearing at one end against the said collar, a sliding head against which said spring bears, grapple jaws pivoted to the shank and provided with stop lugs to limit the closing action of said jaws, arms pivoted to the sliding head, triggers on said arms for engaging the jaws, and a transverse contact rod connected to said arms.

In testimony whereof I affix my signature in presence of two witnesses.

WELLINGTON A. B. RICHARDSON.

Witnesses:
J. W. ERHEUB,
IRVING ELDREDGE.

---

Copies of this patent may be obtained for five cents each, by addressing the "Commissioner of Patents, Washington, D. C."